United States Patent
Deimel et al.

(10) Patent No.: US 9,180,907 B2
(45) Date of Patent: Nov. 10, 2015

(54) STEERING SYSTEM FOR UTILITY VEHICLES WITH BILATERAL ACTUATION

(71) Applicant: Rheinmetall MAN Military Vehicles GmbH, Vienna (AT)

(72) Inventors: Michael Deimel, Sitzenberg (AT); Rudolf Pertlik, Vienna (AT)

(73) Assignee: Rheinmetall MAN Military Vehicles GmbH, Vienna (AU)

( * ) Notice: Subject to any disclaimer, the term of this patent is extended or adjusted under 35 U.S.C. 154(b) by 0 days.

(21) Appl. No.: 14/305,466

(22) Filed: Jun. 16, 2014

(65) Prior Publication Data

US 2014/0291061 A1   Oct. 2, 2014

Related U.S. Application Data

(63) Continuation of application No. PCT/EP2012/075657, filed on Dec. 14, 2012.

(30) Foreign Application Priority Data

Dec. 15, 2011  (EP) .................................... 11009877

(51) Int. Cl.
*B62D 5/12*   (2006.01)
*B62D 7/08*   (2006.01)

(52) U.S. Cl.
CPC ... *B62D 5/12* (2013.01); *B62D 7/08* (2013.01)

(58) Field of Classification Search
CPC .............. B62D 5/12; B62D 5/22; B62D 5/30; B62D 7/08; B62D 7/20; B62D 7/142
See application file for complete search history.

(56) References Cited

U.S. PATENT DOCUMENTS

| | | | | |
|---|---|---|---|---|
| 4,219,093 | A | * | 8/1980 | Lang .............................. 180/401 |
| 5,267,625 | A | * | 12/1993 | Shimizu ........................ 180/443 |
| 6,135,232 | A | | 10/2000 | Salg |
| 2013/0240287 | A1 | * | 9/2013 | Williams et al. .............. 180/422 |
| 2014/0008885 | A1 | * | 1/2014 | Kim ................................ 280/98 |

FOREIGN PATENT DOCUMENTS

| | | |
|---|---|---|
| DE | 27 19 895 | 11/1978 |
| DE | 37 36 424 A1 | 5/1988 |
| DE | 37 40 052 A1 | 6/1988 |
| DE | 197 55 278 A1 | 6/1999 |
| EP | 0 291 844 A2 | 11/1988 |
| EP | 291844 A * | 11/1988 |
| EP | 1 120 330 A1 | 8/2001 |
| EP | 1 559 635 A1 | 8/2005 |
| EP | 2 338 763 A1 | 6/2011 |
| GB | 1 597 057 | 9/1981 |
| GB | 2 275 662 a | 9/1994 |
| GB | 2275662 A * | 9/1994 |
| WO | WO 00/71408 A1 | 11/2000 |

* cited by examiner

*Primary Examiner* — Kevin Hurley
*Assistant Examiner* — Gabriela C Craciun
(74) *Attorney, Agent, or Firm* — Muncy, Geissler, Olds & Lowe, P.C.

(57) ABSTRACT

An auxiliary element is incorporated into a steering apparatus and that, in addition to the steering circuit, a further steering circuit is provided on the same axle. A movement is forced upon the auxiliary element by a further kinematic coupling, such that the movement is additionally transmitted to the opposite wheel by the auxiliary element. The transmission increases boost to the steering force.

9 Claims, 2 Drawing Sheets

STEERING SYSTEM FOR UTILITY VEHICLES WITH BILATERAL ACTUATION

This nonprovisional application is a continuation of International Application No. PCT/EP2012/075657, which was filed on Dec. 14, 2012, and which claims priority to European Patent Application No. 11009877.9, which was filed in Europe on Dec. 15, 2011, and which are both herein incorporated by reference.

BACKGROUND OF THE INVENTION

1. Field of the Invention

The invention is directed to a two-circuit steering system, in particular for military but also for civil utility vehicles, having a steerable axle. For the transmission of high steering forces to the wheels, a conventional steering gear is assigned an auxiliary element on which the movement is forced by way of a kinematic coupling to the steering gear, such that the movement is additionally transmitted via the auxiliary element to the opposite wheel. Further, a steering system with bilateral activation is proposed.

2. Description of the Background Art

Steerable axles comprise a rigid axle which is connected to a vehicle frame and on the ends of which steerable wheels are mounted in an articulated manner. A steering gear and various transmission elements transmit the steering movement from a steering wheel to the wheels (DE 100 58 628 B4). A wheel bearing arrangement for a steerable axle of a vehicle is disclosed for example in DE 20 2004 021 236 U1. An articulated configuration of, and steering arrangement for, a driven or non-driven rigid rear axle of a utility vehicle emerges from DE 296 08 229 U1. DE 20 2004 021 588 U1 is also concerned with a utility vehicle steering system.

Most military vehicles have all-wheel drive. Here, in the case of utility vehicles, aside from the 4×4 drive configuration, the 6×6 and 8×8 drive configurations are often also encountered. In the case of a 4×4 utility vehicle, the utility vehicle has two axles, one front axle and one rear axle. The transmission of a steering movement takes place only to the front axle. In the case of utility vehicles of said type, high steering forces arise in the event of high axle loads.

SUMMARY OF THE INVENTION

It is therefor an object of the invention to provide a steering system which can transmit high steering forces to the wheels.

In an embodiment, the invention is based on the concept of incorporating a two-circuit steering system.

A hydraulic two-circuit steering system is described in EP 1 120 330 B1 (DE 600 00 284 T2), which corresponds to U.S. Pat. No. 6,712,176, which is incorporated herein by reference. The steering system has, in a first circuit, a control unit and a first steering motor that is connected to said control unit via working ports, whereas the second circuit is connected to a second control unit, and the latter is connected to a second steering motor. The switching or activation of the respective circuit is performed via a switching valve.

A steering gear for a power steering system having two hydraulically mutually separate steering circuits is disclosed inter alia in DE 37 40 052 A1 and also in DE 27 19 895 B1 and in DE 37 36 424 A1, which are all incorporated herein by reference.

A steerable axle with a hydrostatic two-circuit steering system for utility vehicles emerges from DE 197 55 278 A1, which corresponds to U.S. Pat. No. 6,135,232, and which is incorporated herein by reference. The steerable axle comprises a first double-acting pressure medium cylinder which, in the region of its center, is connected to an axle spine housing and which is connected at its two ends via track rods to joint housings. An additional, second double-acting pressure medium cylinder is installed on one side of the axle. Said pressure medium cylinder interacts simultaneously with the first pressure medium cylinder.

This contrasts with the present invention. It is the intention here, in the case of a conventional steering gear, to include an auxiliary element and to provide, in addition to the (first) steering circuit, a further steering circuit on the same axle. Here, the kinematic coupling between the steering wheel movement and the wheel movement is analogous to that in a conventional utility vehicle. A steering gear actuates the steering lever at the steering knuckle. Here, the auxiliary element however has the movement forced on it by way of a further kinematic coupling, such that the movement is additionally transmitted via the auxiliary element to the opposite wheel. Said transmission serves to boost the steering force. Steering comfort is increased in this way. The two-circuit steering system that is provided is also capable of being retrofitted.

In order to achieve decoupling of the load paths, the invention provides in an embodiment for the steering gear and auxiliary element to be installed on opposite sides of the vehicle. The auxiliary element, a hydraulic cylinder and rotary booster are therefore mounted on that side of the vehicle which is situated opposite the steering gear (generally on the co-driver's side). In this way, a steering system or steering apparatus for utility vehicles is created which has bilateral actuation.

Further scope of applicability of the present invention wily become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
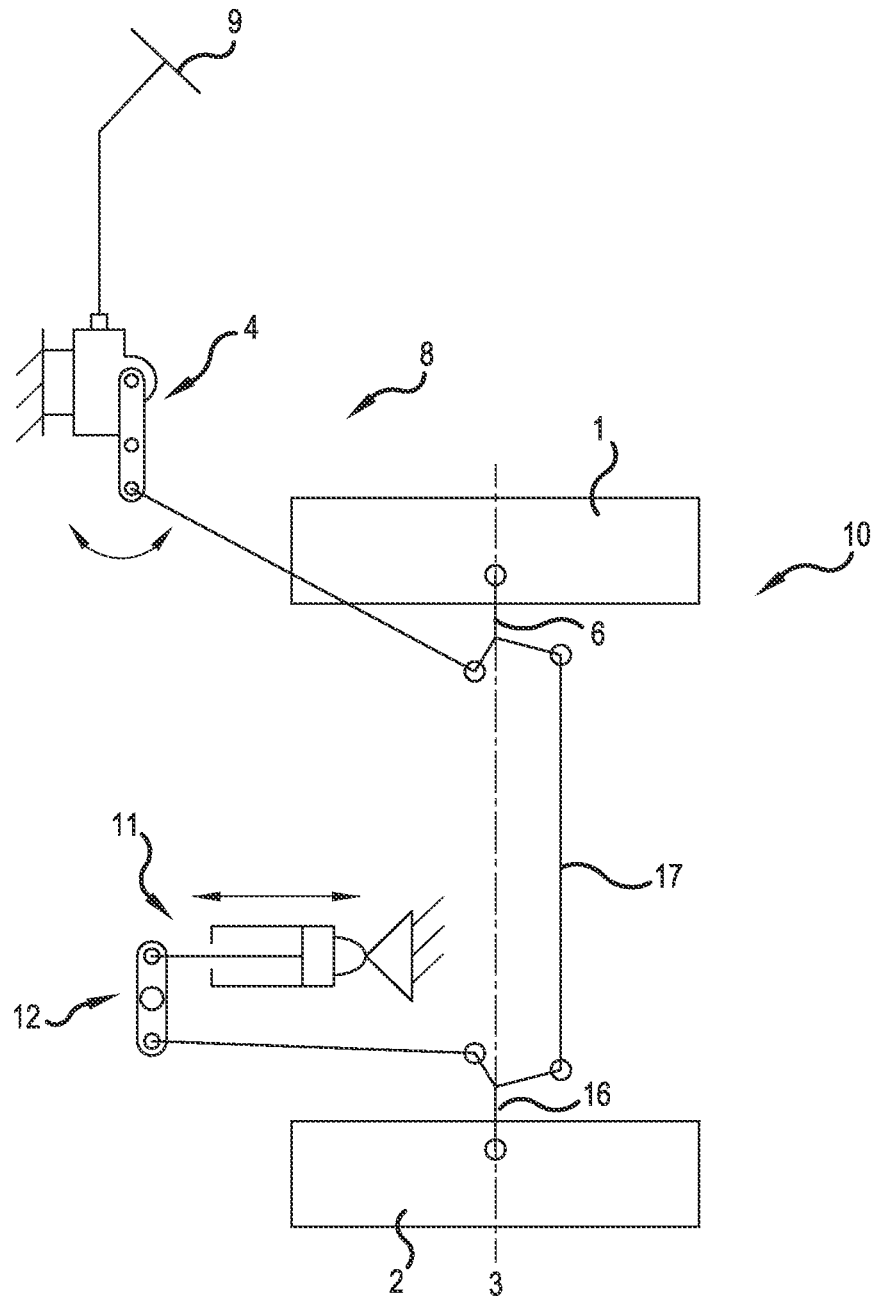
FIG. 1 is a diagrammatic illustration of the incorporation of an auxiliary element for the purpose of creating a two-circuit steering system.
Figure 2A:
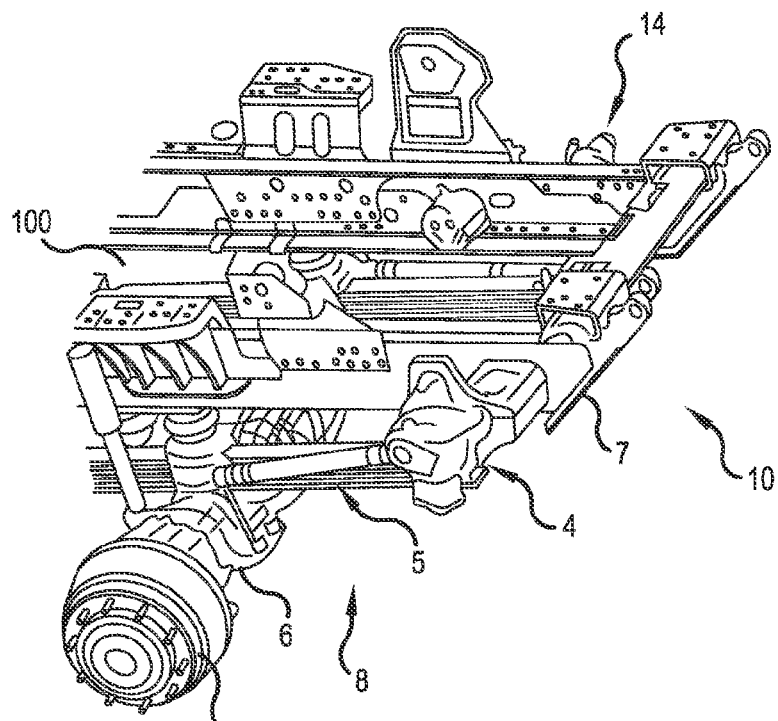
FIGS. 2a, 2b show a structural illustration of the incorporation of the components on a vehicle.

FIG. 1 shows the basic principle of a steering configuration according to the invention. Indicated in said figure are wheels 1, 2 which are fastened to a (front) axle 3. The numeral 4 denotes a preferably conventional steering gear which, in a known way, acts for the adjustment of the wheel 1 and thus of the wheels 1, 2 when a steering element 9, for example a steering wheel, is operated (FIG. 2a). In addition to the steering gear 4 and a first steering circuit 8 provided therewith, an auxiliary element 11 is incorporated into the steering configuration as a further steering circuit 12, which auxiliary element assists the adjustment of the wheel 2. The steering gear 4 is the actuating unit for both steering circuits 8 and 12.

Figure 2B:
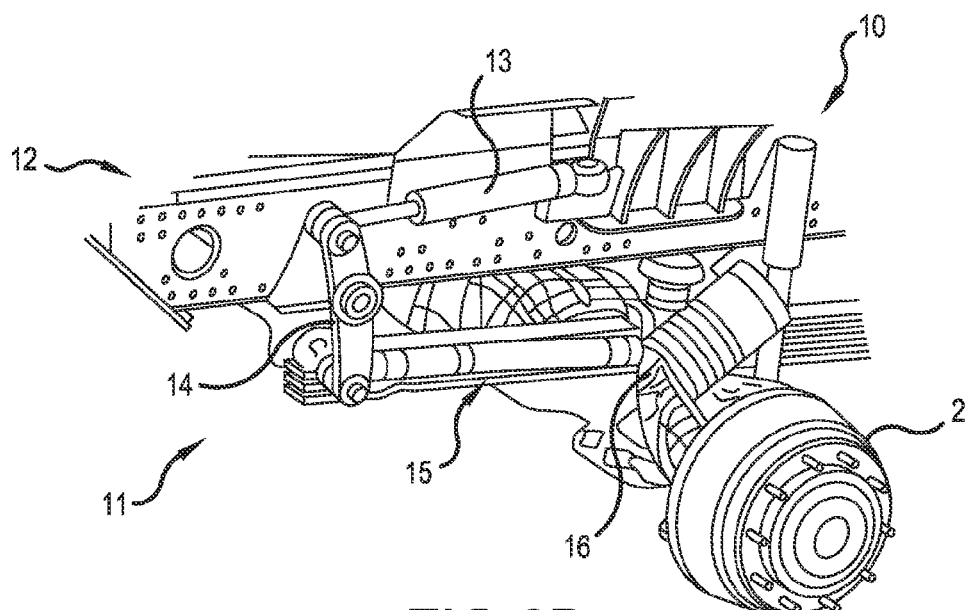

FIG. 2a and FIG. 2b show further details of the steering apparatus 10 thus created.

FIG. 2a illustrates the conventional steering gear 4 with steering Pitman arm. Said steering gear 4 acts, in a known way, on a steering lever 6 via a steering push rod 5 and can thus move—steer—the wheel 1, for example the right-hand wheel of the vehicle 100 that is merely indicated here, to the right or to the left. The numeral 7 denotes a steering bracket. Said components form the first steering circuit 8.

FIG. 2b shows the second steering circuit 12 which is created through the incorporation of the auxiliary element 11. The auxiliary element 11 is formed by a working cylinder 13 which acts via a rocker arm 14 and a steering push rod 15 on a steering lever 16, whereby the wheel 2, that is to say in this case the left-hand wheel, can be adjusted to the right or to the left, in such a way as to provide assistance to the wheel 1—in this case the right-hand wheel—that is situated or mounted on the opposite end of the axle 3.

Also, a track rod 17 can be incorporated behind the axle 3, as shown in FIG. 1. The steering element 9 may also be formed by a more modern version (joystick etc.).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A steering apparatus for a steerable axle of a vehicle, comprising:
   a first steering circuit formed from a steering gear that acts directly on at least a first wheel via transmission elements when a steering element is operated; and
   a second steering circuit having an auxiliary element that acts on a second wheel so as to assist the wheel movement of the first steering circuit,
   wherein the transmission elements of the first steering circuit include a steering lever,
   wherein the auxiliary element is formed at least from a working cylinder that acts on transmission elements of the second steering circuit, the transmission elements including a rocker arm, a steering push rod and a steering lever,
   wherein a first end of the rocker arm is connected to the working cylinder and a second end of the rocker arm is connected to the steering push rod,
   wherein a first end of the steering push rod is connected to the second end of the rocker arm and a second end of the steering push rod is connected to the steering level, and
   wherein a track rod is incorporated behind the axle, a first end of the track rod connected to the steering lever of the first steering circuit and a second end of the track rod connected to the steering lever the second steering circuit.

2. The steering apparatus as claimed in claim 1, wherein the transmission elements of the first steering circuit further include a steering push rod connected to the steering lever.

3. The steering apparatus as claimed in claim 1, wherein the auxiliary element is mounted on a side of the vehicle that is situated opposite to a side of the vehicle that the steering gear is mounted.

4. The steering apparatus as claimed in claim 1, wherein the steering gear is an actuating unit for the first and the second steering circuit.

5. The steering apparatus as claimed in claim 1, wherein the working cylinder is a hydraulic cylinder.

6. The steering apparatus as claimed in claim 1, wherein the track rod extends from the first steering circuit to the second steering circuit, such that the track rod extends from one side of the vehicle to an opposing other side of the vehicle.

7. The steering apparatus as claimed in claim 1, wherein the track rod is directly connected to both the steering lever of the first steering circuit and the steering lever of the second steering circuit.

8. The steering apparatus as claimed in claim 1, wherein the first end of the rocker arm is directly connected to the working cylinder.

9. The steering apparatus as claimed in claim 1, wherein the steering lever of the second steering circuit is connected between the second wheel and the steering push rod and between the second wheel and the track rod.

* * * * *